United States Patent [19]

Carroll et al.

[11] 4,368,578

[45] Jan. 18, 1983

[54] ORBITAL MISSION PLANNING INDICATOR

[75] Inventors: William J. Carroll, Cypress; James W. Patrick, Fullerton, both of Calif.

[73] Assignee: Rockwell International Corporation, Downey, Calif.

[21] Appl. No.: 97,090

[22] Filed: Nov. 23, 1979

[51] Int. Cl.³ .................. G01C 21/00; G01C 21/24
[52] U.S. Cl. .................. 33/1 SA; 434/140
[58] Field of Search .............. 33/1 SA, 1 SC, 1 SB; 434/146, 130, 140

[56] References Cited

U.S. PATENT DOCUMENTS

| | | | |
|---|---|---|---|
| 2,687,582 | 8/1954 | Storz | 33/1 SA |
| 2,949,682 | 8/1960 | Humbert | 33/1 SA |
| 3,195,243 | 7/1965 | Sundblad | 434/140 |
| 3,199,229 | 8/1965 | Easton | 434/140 |
| 3,241,252 | 3/1966 | Baalson | 434/140 |
| 3,243,897 | 4/1966 | West | 33/1 SA |
| 3,303,583 | 2/1967 | Peterson | 434/140 |
| 3,535,790 | 10/1970 | Gray et al. | 33/1 SC |

FOREIGN PATENT DOCUMENTS 995014   6/1965   United Kingdom .............. 33/1 SA Primary Examiner—William D. Martin, Jr.
Attorney, Agent, or Firm—Harold C. Weston; H. F. Hamann

[57] ABSTRACT

An orbital mission planning indicator device provides a visual indication of the relationship between the plane of orbit of an artificial earth satellite and the angle of incidence of solar energy thereon, for all seasons of the year and for arbitrary times and places of launch of such satellite. It also provides indications of the relationship of deep space points of interest to the same orbital plane for adaptability of pointable sensors such as telescopes, antennas and solar arrays to orbital missions calling for use of such equipments.

7 Claims, 12 Drawing Figures

ORBITAL MISSION PLANNING INDICATOR

BACKGROUND OF THE INVENTION

1. Field of the Invention

This invention relates to indicator devices associated with celestial mechanics and, more particularly, to an indicator that provides an easily understood graphic display of the angle between the solar radiant vector and the plane of orbit of an artificial earth satellite (beta angle). Utilizing an earth-centered universe fiction, the device illustrates causes and effects of beta angle variation through seasonal variations of earth's position about the sun and for different conditions of orbit creation (viz. time of year, time of day at launch and location of the launch site).

Since appreciable numbers of future space missions will depend on solar panels of photo-voltaic arrays for operational power, planning of such missions must include availability of solar energy, earth eclipse periods and other features affecting the same. Similarly, studies of deep galactic points of interest will depend on uninterrupted line of sight access to the same by means of telescopes, antennas and other highly directional equipments. Planning for this latter type mission is also facilitated by the within device.

2. Description of the Prior Art

Many two and three dimensional models of our planetary system are available for educational presentation of solar system geometry and the relationship between planets of our solar system. No such models are available for presentation of the relationship between artificial earth satellite orbital planes and the solar radiant vector, as is available from the within invention. It presents a clear, visual display of the effect of seasonal changes in the earth's position, in its orbit around the sun, upon established orbits of artificial earth satellites. Wide-spread use of such satellites for communications, mapping, natural resource management and earth surveillance has created a need for such an easily understood, reasonably priced indicator.

A variety of transparent plastic spheres with star patterns, planetary orbit references and complicated control and suspension means are available to represent certain features of artificial earth satellite operation, but cost, complexity and lack of availability preclude their general use. We are not aware of the existence of a device relating earth satellite orbital planes to both earth's solar vector and to the galactic plane as does the within device.

SUMMARY OF THE INVENTION

Utilizing plane surfaces to represent features of our galaxy, the Milky Way, and simplifying certain complex features of earth's solar orbit, the within device incorporates an earth-centered universe concept and a movable solar vector reference element to illustrate relationships difficult to visualize and utilize in casual discussions and conference table representations.

The invention uses the concept of an earth-centered universe to portray relationships of interest. A number of other simplifications and approximations are incorporated into the device, and one reasonably skilled in celestial mechanics can readily account for these.

The most noteworthy of such simplifications is the use of a movable solar vector ring with a tab indicating the direction of flow of solar radiation. On the device proper, a reference element which shows earth's equatorial plane, is fixed onto the device's frame at an angle of about 23½ degrees to the frame's upper surface, which upper surface corresponds to earth's ecliptic plane. The "frame" referred to may be any of a number of support elements such as gimbals, roller supported rings or others. In one embodiment hereof, the equatorial plane element has mounted thereon, a half globe of earth's northern or southern hemisphere. This earth representation is rotatable about an axis through its center, which center, in turn, is representative of the earth's polar axis. Such an element may well be varied to include the entire earth "globe" or the whole, or part, of another planet or celestial body about which orbital missions are to be conducted. When other than an "earth element" is used, various features of the invention such as the months of the year, equatorial plane angles, and other earth peculiar features, would be altered or reidentified as appropriate. Wherever the term "earth reference element" or "earth element" is used herein, it shall be understood that "planetary body" and appropriate representations thereof may be equally applicable.

In the preferred embodiment discussed below, this three dimensional hemisphere is replaced by a polar projection mapping of the northern or southern hemisphere and, while the three dimensional embodiment provides easier visualization of orbital features, the greater simplicity, decrease in costs and other advantages of the "flat earth" type show plainly that little is lost by use thereof. The user will be better assisted in the visualization needed for mission planning by use of either of the above two embodiments than by use of conventional star maps and globes independently.

In the hemispherical embodiment illustrated in FIGS. 1, 5 and 6, an orbital plane element is attached to a carrier plate which is rotatable about the polar axis of the hemisphere. The hemisphere is itself rotatable about an axis fixed perpendicular to a plane surface element representing the earth's equatorial plane, inclined at an angle to the ecliptic plane, that plane in which the earth travels about the sun.

That orbital plane element is angularly adjustable with respect to the carrier plate. Such angular adjustment may well derive from that element's being hingeably attached to the carrier plate itself. It is configured in an arc to fit the curvature of the hemispheric earth element. A protractor ring element is also angularly adjustable to the carrier plate with its hinge axis at 90 degrees to that of the orbital plane element hinge axis. The orbital plane element is provided directional indicators to show direction of motion of the artificial earth satellite.

In use, the protractor ring element is hinged upward from the equatorial plane element and the orbital plane element is then moved to that angle of orbit inclination planned for the mission as measured by the protractor. The carrier plate is then rotated so that the orbital plane element passes through the earth launch site involved.

Note that United States satellites are launched from one of two sites, Vandenberg Air Force Base (VAFB), California, for polar orbits, and from Kennedy Space Center (KSC), Florida, for others. Range safety considerations permit launchings from VAFB into orbital inclinations between approximately 70 and 104 degrees, while KSC launches are constrained to those between 28½ and 57 degrees.

In the preferred embodiment of this invention, a key element is a solar vector indicator ring which is positioned around the periphery of the equatorial plane element and which is rotatable in the ecliptic plane. A tab on this element, representing the sun, is movable to projected times of interest about the earth reference element. Indicator arrows on this tab show direction of flow of solar energy.

The ecliptic plane element may be a plane surface of supportive material such as plastic or cardboard. All plane elements discussed previously herein, or hereafter, may be of the same or different type of material which may or may not be transparent. A circular cutout is provided in the ecliptic plane element and support means are used at its edges to hold an equatorial plane element at an angle of 23½ degrees thereto. This equatorial plane element will support the earth hemisphere, or the planar polar projection earth element to be discussed later, and the carrier plate with its protractor and orbital plane element.

The 12 months of the year are printed around the periphery of the cutout in the ecliptic plane element, in normal order and in counterclockwise mode. The Summer solstice, June 21st, will occur at the lowest point of the equatorial plane element so that its highest part is positioned opposite December 21st of the ecliptic plane. The vernal and autumnal equinoxes are identified as those two locations on the support element where the equatorial plane intersects the ecliptic plane, at about March 21st and September 21st respectively.

To use the indicator for a given launch date and launch site, set the solar vector tab to the month (approximate the day of the month by interpolation of the center of the tab thereon) and move the carrier plate so that the orbital plane element intersects the solar vector ring on the ascent mode side of the orbital plane element at the approximate time of day of the desired launch. Position the earth element so that the earth launch site is adjacent the ascending mode of the orbital plane. Time of day is approximated, quite roughly, by considering 6:00 AM and 6:00 PM as the points 90 degrees left and right respectively, on the solar vector ring, from the tab itself. The solar vector ring is divided into a "sunny" side and a "shadow" side, indicative of day or night times for those portions of earth directly opposite the corresponding ring section. Dawn Terminator and Dusk Terminator, marked on the ring, give a quick, and rough, estimate of time of day at earth element sites adjacent the orbital plane element or other points of interest on the device.

Orbital plane inclination is set in by locking the orbital plane element to the proper angle on the protractor element.

Note that the earth element is not essential to use of the device for solar vector incidence angle illustration, and its incorporation into the device is to provide a touch of realism to the user and to allow for detailed time of day, and location of launch site.

To demonstrate the effect of time passage on beta angle, move the solar vector tab as desired and note the change in beta angle as the solar vector changes its position relative to the orbital plane element. The device can also give the user a rough idea of ground traces of satellites through scaled movement of the earth reference element at the rate of 15 degrees of earth rotation per hour of orbital period.

While the device makes no special provision for orbital plane precession with time, it does provide an easily controlled means to compensate for the phenomenon. Satellites in orbit react to the net inertial force resulting from centrifugal force counteracted by gravitational attraction. Since the earth is not a pure sphere, its oblateness results in forces of attraction which vary in different portions of the orbit. These forces react on the satellite in much the same manner as do external torques on toy tops and gyroscopes. The satellite's angular momentum is conserved but the orbit precesses about an axis 90 degrees from the direction in which the external torque is applied. For a typical 90 minute West to East orbit, in orbital planes between 30 and 55 degrees inclination, such precession amounts to about 6 degrees to the west for each 24 hours. The device does not compensate or provide for such precession but it does allow orbit calculators to manually set typical time spans and accumulated drifts into a visual array so that they can then account for and modify the effects by establishing different orbital parameters.

For commonly used orbital parameters of 250 nautical miles altitude and inclination of 30 to 40 degrees, resulting precession rates will have values of minus (westerly) 6 to 7 degrees per day (KSC launches).

VAFB launches at inclinations greater than 90 degrees result in orbital planes having easterly precession rates. As such, VAFB launches have the unique property of allowing orbits whose easterly precession rate can exactly match the rate of earth's revolution about the sun. Displacement of the ascending node of the orbital plane along the earth's equatorial plane is due primarily to gravitation anomalies of an oblate earth. Rate of this precession, for circular orbits, may be expressed by the following equation:

$$\dot{\Omega} = -10 * \left( \frac{R_E}{R_E + h} \right)^{3.5} * \cos i$$

where
$\dot{\Omega}$ = precession rate in degrees per day, measured as positive for eastward motion of the ascending node along the equatorial plane
$R_E$ = earth's radius (3444 nautical miles)
h = orbital altitude in nautical miles
i = inclination angle in degrees It is readily noted that, since the cos i term goes from positive to negative as angle i goes from less than 90 to greater than 90 degrees, the quantity $\dot{\Omega}$ goes from a negative (westerly) value to a positive (easterly) one correspondingly.

While a hemispherical earth element is helpful for the purpose of lending a touch of realism to the within device, other significant advantages of the invention result in the preferred embodiment hereof being the configuration called out below.

Using standard cut, slit and fold design techniques, a strong, serviceable model of this device, incorporating the essentials of the invention, has been produced for reliable, inexpensive production and assembly. FIG. 9 is an isometric view of such an embodiment. That figure illustrates how all functional elements of the device are fabricated from heavy paper with a mechanical axle, or pivot pin, coupling the earth element and carrier plate to the equatorial plane element and ecliptic plane proper.

Pre-cut support members are hinged to the ecliptic plane and, when folded on designed marker lines, couple the equatorial plane to the ecliptic plane element at the desired angle of 23½ degrees. Support members may be provided with Velcro pads to mate with corresponding pads on the equatorial plane element for easy, stable construction. Suitable adhesives or mechanical devices such as paper clips can be used for retention of parts in proper relationships.

The preferred embodiment, depicted in FIG. 9, is printed, cut and shipped in a flat envelope for ease and security of handling.

While it is not intended as a precision instrument for calculation and high accuracy resolutions, the within instrument is a valuable visual reference for work to be done with future industrialization of space and galactic studies made from space platforms and other satellites placed in orbit by this country's Space Transportation System and NASA's Space Shuttle orbiter.

Accordingly, it is an object of this invention to provide an earth orbit planning indicator which clearly illustrates the effects of earth's motion about the sun on possible orbits of artificial earth satellites.

Another object is to provide an indicator device which displays the effects of launch site and time on resulting orbits of earth satellites.

Still another object of the invention is to provide potential satellite users with an easily operated indicator which shows the effects of various earth orbits on direction sensitive equipments in space.

It is a further object of this invention to provide a device enabling fast, easily understood indications of the effect of launch site and time on long term performance of solar collector panels and direction sensitive space equipments.

A still further objective of this invention is to provide an inexpensive, reliable indicator device for use in conferences or class-rooms to illustrate the effects of earth's orbital position on the orbits of its own artificial satellites.

These objectives and other practical uses of this invention can be achieved by exploiting features thereof as described, in detail, in the following specification and drawings, of which:

DETAILED DESCRIPTION OF THE PREFERRED EMBODIMENT

Figure 9:
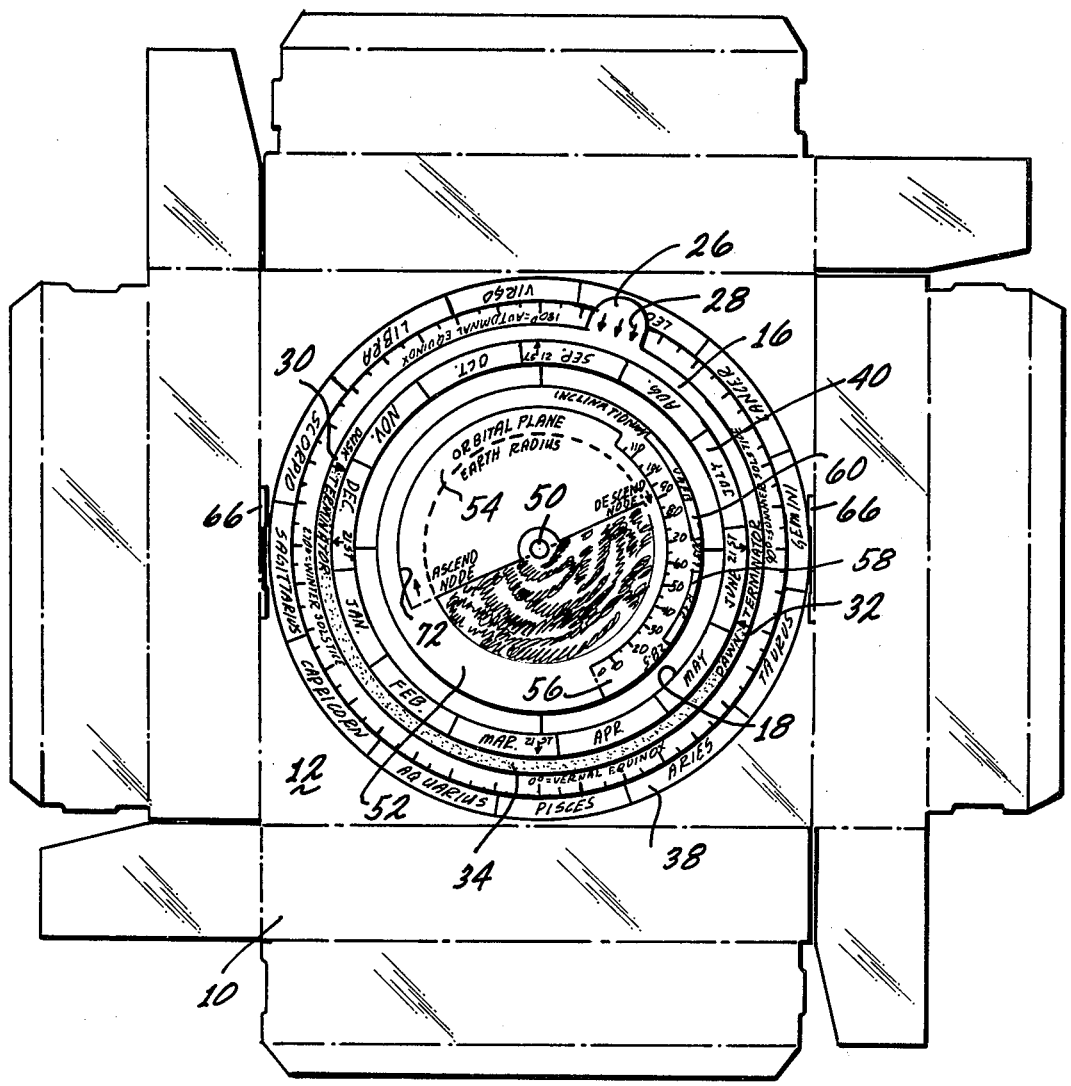
FIG. 9 is a top view of the preferred embodiment of this invention in its disassembled condition.
Figure 10:
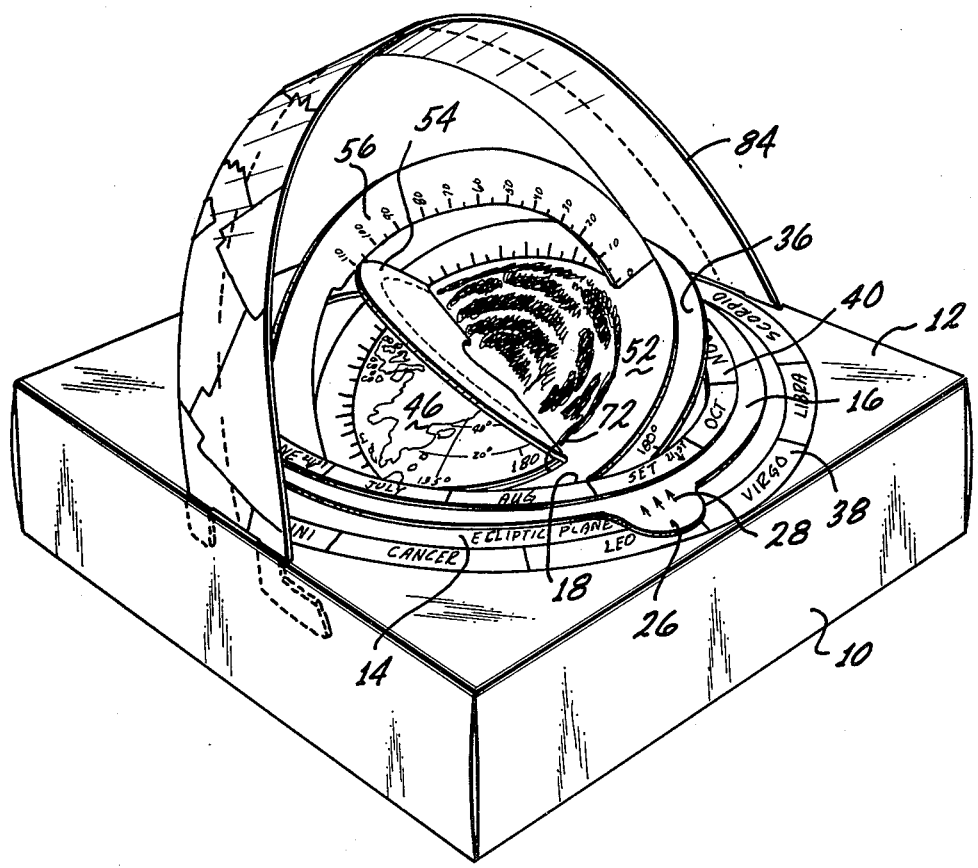
FIG. 10 is an isometric view of the preferred embodiment in its normal, use condition.
Figure 11:
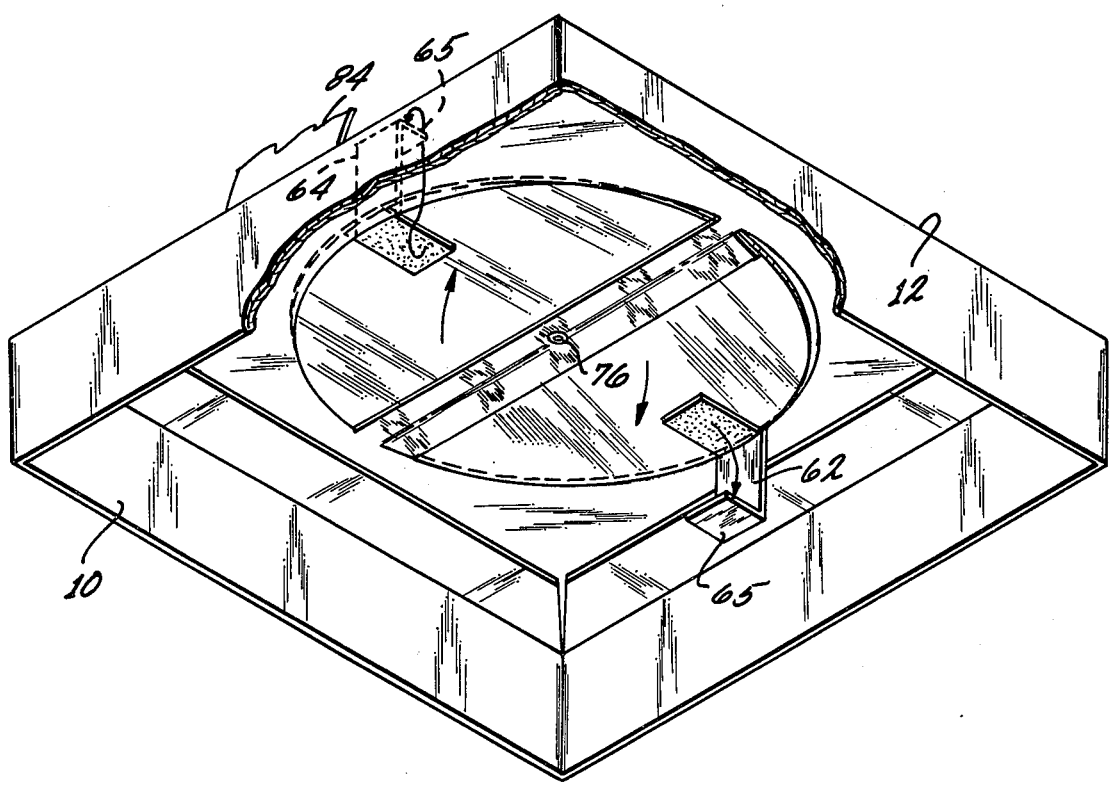
FIG. 11 is a bottom, partially sectional, view of the preferred embodiment.
Figure 12:
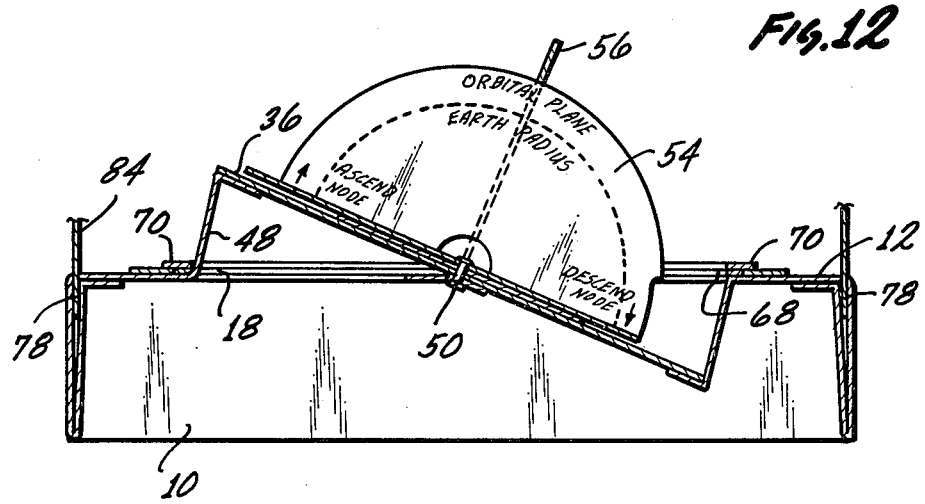
FIG. 12 is a sectional view of the preferred embodiment of the invention in its normal use condition.

FIG. 10 is an isometric view of the preferred embodiment of this invention. Frame 10, in its simplest form, may be merely a support element and may be fabricated from heavy paper, cut, slit and foldable as shown in FIG. 9. The top of frame 10, planar surface 12, is stamped or printed with seasonal indicia such as months of the year, signs of the zodiac, times of the different soltices and equinozes, and other material of interest and value. This surface 12 is referred to herein as ecliptic plane element 14.

Ecliptic plane element 14 has a partial circular cutout 18 with support means 48, a strip of surface material, remaining across a diameter thereof. Adjacent the right-hand edge of this strip will be an angular segment of approximately 30 degrees identified as "Sept." with the center of the strip being displaced slightly to the aft quarter section of the segment.

Cutout 18 shall have twelve similarly equally sized angular sections surrounding it with each segment identified as a month of the year, each month in sequence, in a counterclockwise fashion, from September on the righthand side to March directly opposite, i.e. lefthand side.

Frame 10 has two tabs of surface material retained (or, alternatively, attached) at 180 degrees from each other to act as securement means, tabs 62 and 64, for attachment of equatorial plane element 36 to frame 10.

Equatorial plane element 36 is circular in shape and is fabricated from heavy paper, plastic or suitable material. It is affixed to securement means, tabs 62 and 64, after such tabs have been positioned so that tab 62 adjacent December of ecliptic plane 14 is above the plane and tab 64 adjacent June is below it. Flaps 63 and 65 will be oriented parallel to the lower surface of equatorial plane element 36. Small pads of Velcro may be bonded to flaps 63 and 65 for mating with pads bonded to the underside of ecliptic plane element 36 (any type of bonding will suffice for a "one time" permanent assembly).

When element 36 is mounted onto flaps 63 and 65, element 36 will be supported across its center by supporting strip 48. Supporting strip 48 may have half its width slit from surface 12, as at 66, to allow that half to be hinged downward into frame 10. This half may be fitted with a hole 76 suitable for placement therethrough of axial pin means 50. Parts may be assembled into a working model as called for below:

Axial pin means 50 couples equatorial plane element 36 fixedly to support means 48 but allows earth element 46 and carrier plate 52 to rotate about it on equatorial plane element 36. This axial pin means 50 is fixed at support means 48, but passes through elements 46 and 52 at centers 47 and 53, respectively.

Tabs 62, 64 are sized to provide an inclination angle of 23½ degrees to equatorial plane element 36 when it is affixed to frame 10 as called for above. In a typical preferred embodiment, cutout 18 is approximately 5¾ inches in diameter and tabs 62, 64 are approximately 1 5/16 inches, mating with equatorial plane element 36 at its outer edge, resulting in a tilt angle of approximately 23½ degrees.

Top surface 12 of frame 10 may have a washer type element 68 bonded to it with adhesive of some type so that element 68 and cutout 18 are coaxial and the inner circumference of element 68 coincides with that of cutout 18. Outer circumference of washer type element 68 is slightly shorter than the inside circumference of solar ring 16. Washer type element 68 is bonded to top surface 12 around the edge of cutout 18. Solar vector ring 16 is then placed over that element and bearing plate 70 is bonded to element 68, also with an appropriate adhesive. All the above elements may be fabricated of the same material, and, even though no special clearance tolerance is provided for, experience shows that solar vector ring 16, of the same thickness as washer element 68, is still readily rotatable on ecliptic plane 14 where the inside diameter of ring 16 is slightly larger than the outside diameter of washer 68. Bearing plate 70 maintains solar vector ring 16 parallel to ecliptic plane 14 while allowing circular reorientation thereof.

Solar vector ring 16 has a tab 26 with solar vector directional indicators 28. These indicators show the direction of flow of solar energy, or "solar radiant vector."

Figure 1:
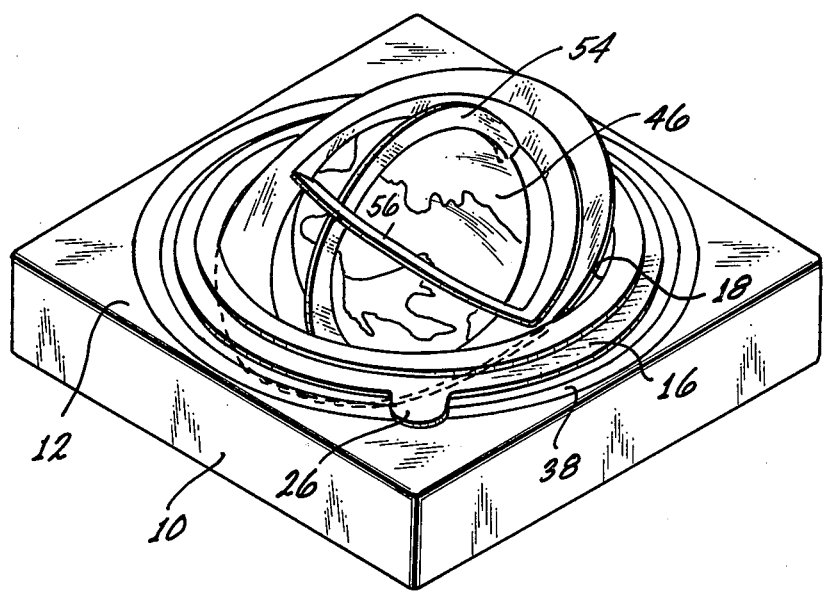
FIG. 1 is an isometric view of the invention fitted to a box-like frame.
Figure 2:
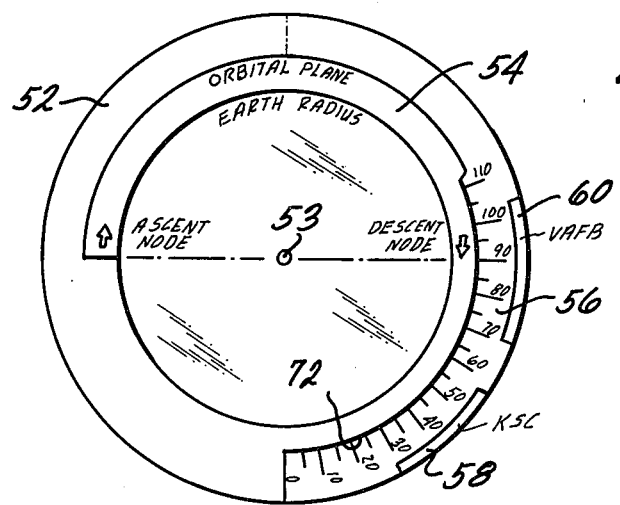
FIG. 2 is a top view of a carrier plate embodiment showing the orbital plane element and protractor element hingeably coupled to said carrier plate by means of cuts in flexible material used in that carrier plate's fabrication.
Figure 3:
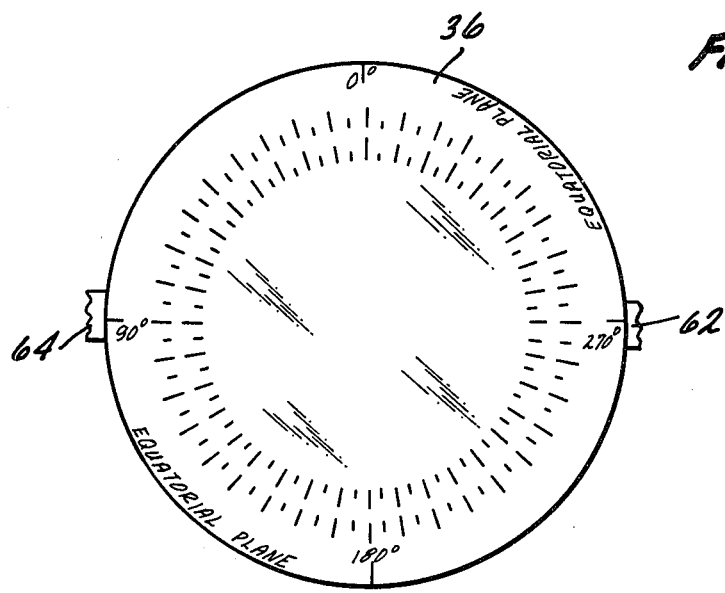
FIG. 3 is a top view of an equatorial plane element having markings at 5 degree intervals.
Figure 4:
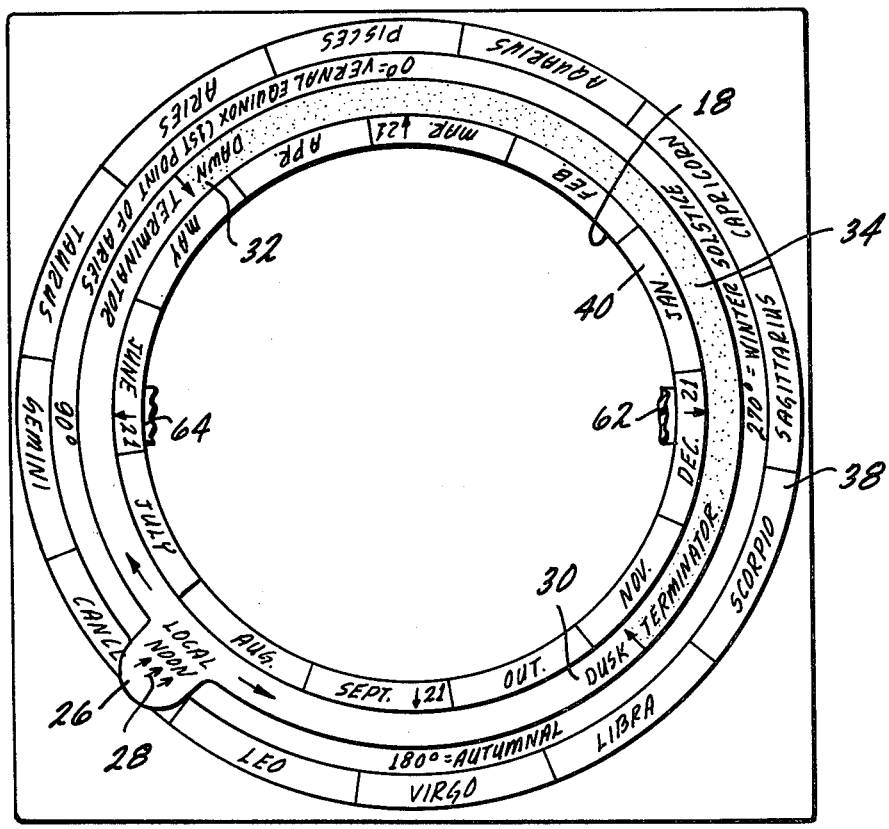
FIG. 4 is a top view of an ecliptic plane element associated with an earth element embodiment of the invention.
Figure 5:
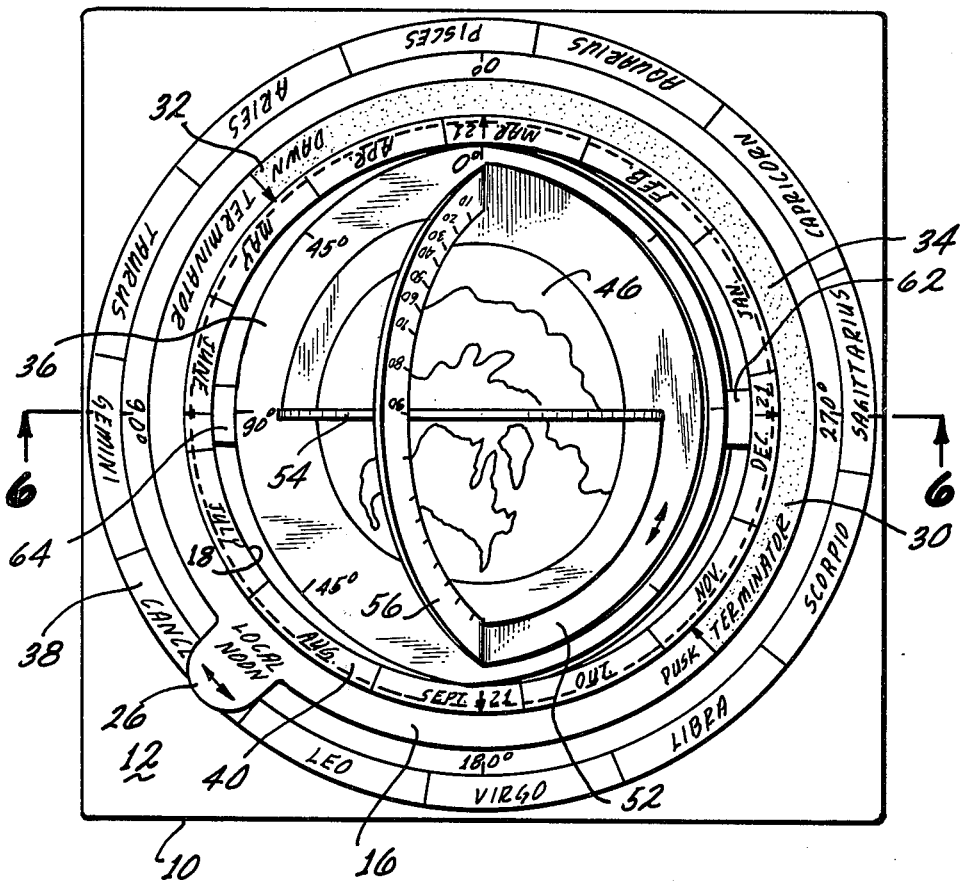
FIG. 5 is a top view of an embodiment utilizing a hemispherical earth reference element.
Figure 6:
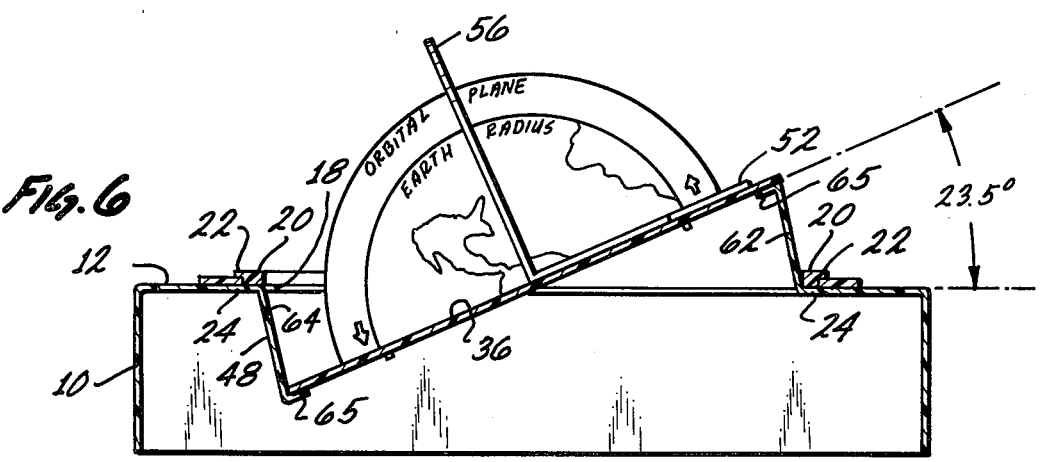
FIG. 6 is a sectional view of the embodiment depicted in FIG. 5.
Figure 7:
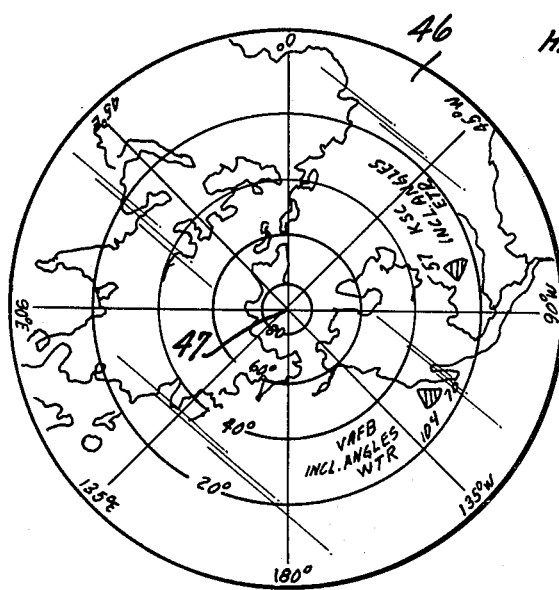
FIG. 7 is a top view of an earth reference element comprised of a flat, polar projection map of earth's northern hemisphere.

Carrier plate 52 is configured in such a manner as to have two elements foldably combined thereon. The plate can be formed of the same material as the other elements. A 270 degree cut 72 may be made through the material on a generally circular pattern of a radius leaving room for labeling of protractor angles over about 110 degrees of the cut. After 110 degrees of the 270 degree cut, the radius of the cut is increased by a small part of an inch, as at 74 of FIG. 2, for the remaining 160 degrees.

The cut sections are then folded so that the last 180 degrees of cut 72 are at 90 degrees from the plane of the element. The smaller radius cut is then folded to the same side of element 52 as the above, for 180 degrees from the start of cut 72. The inner fold is referred to as Orbital Plane element 54 and may have a directional indicator pointing upward at beginning of the cut 72. The inner section of the circular cut may be identified as Orbital Plane reference element 54. It is folded at 90 degrees to the plane of the carrier element and will contact the inner surface of protractor element 56 for retention purposes. The differential radius cut at 74 allows orbital element 54 to be held at the desired angle of the protractor element by friction.

Note that orbital plane element 54 will be slightly deformed by this operation but precision is not an objective of the device and those indications for which the device is used are not dependent on its precision.

Earth element 40 is a polar projection of the northern or southern hemisphere placed on a circular element and rotatably fixed between carrier plate 52 and equatorial plane element 36. It may have special notations for VAFB, KSC or other earth points of interest as launch sites.

Axial pin means 50 may well be a rivet type element which restrains carrier plate 52, earth element 46, and equatorial plane element 36 to ecliptic plane 14 at axis spot 76 of support member 48.

As an additional feature, to assist in astronomy mission planning, a belt of constellation listings 84 representing that portion of our Milky Way galaxy lying above the ecliptic plane, can be readily integrated into the device. Missions designed to scan the galactic plane for special interest data can be projected by placing the orbital plane element coplanar with the equatorial plane of the galaxy (galactic equator is indicated on the belt of constellations). Should extragalactic targets be the object of study, an orbit whose plane is perpendicular to the galactic plane can be planned to avoid obscuration from Milky Way stars.

Figure 8:
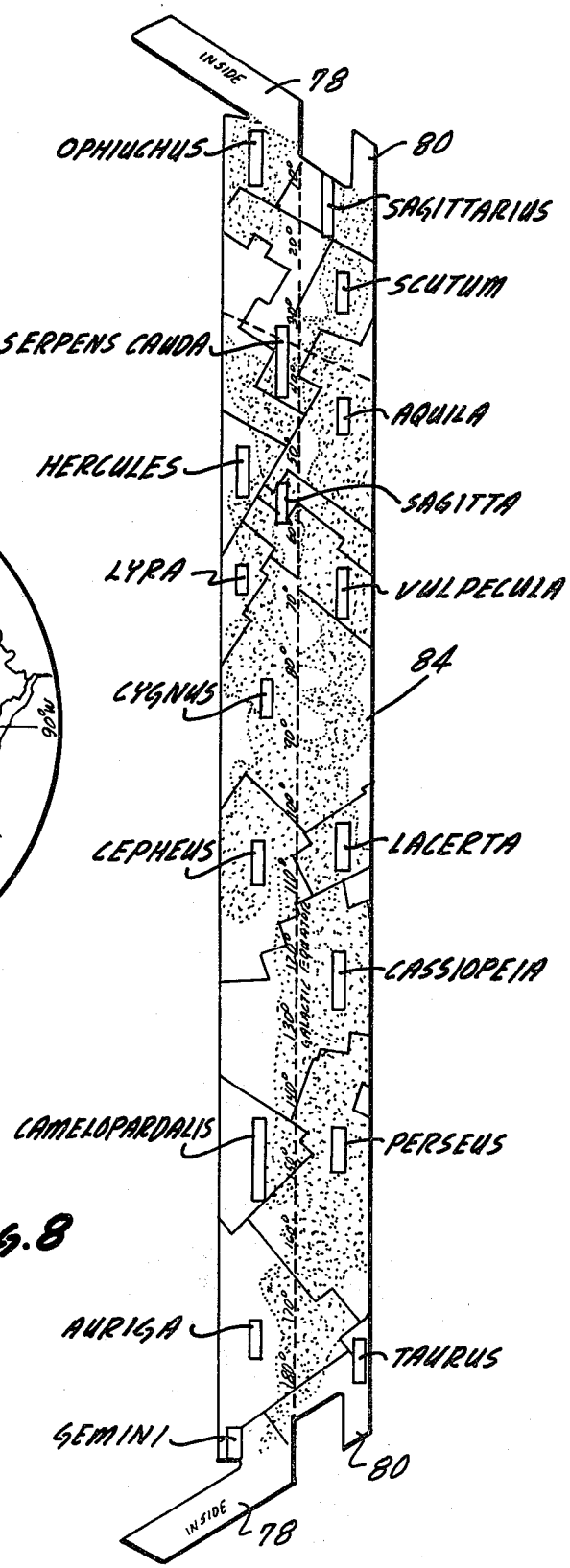
FIG. 8 is a view of the Milky Way galactic band useable with this invention.

Such a belt pictured in FIG. 8, may have toes 78 and heels 80 designed to fit into structural slots 82 of frame 10 for securement in use.

When the belt of listings 84 is removed from the device, folds of frame 10 can be laid flat as shown in FIG. 9, so that the indicator device can be conveniently stored for transport and future use.

No details are given for the setup of the device which will be obvious to a casual user.

What is claimed as novel, non-obvious and useful in this invention is:

1. An Orbital Mission Planning Indicator, comprising, in combination:
   (a) A frame having a first planar surface, said surface being generally horizontal and integral with said frame;
   (b) a second planar surface, integral with said frame and inclined at an angle to said first planar surface with approximately half of said second surface above said first surface and half below the same;
   (c) a planetary reference element rotatably coupled to said second planar surface at a first axis perpendicular to said surface;
   (d) a planar carrier plate rotatably coupled to said planetary reference element for rotation in its plane about said first axis;
   (e) a protractor element, said protractor element coupled to said carrier plate so that said protractor element lies in a plane containing said first axis of rotation of said carrier plate;
   (f) a flat surfaced Orbital Plane reference element, said element hinged to said carrier plate and so hinged as to allow movement about a second axis in the plane of said carrier plate, said second axis oriented perpendicular to the plane of said protractor element; and
   (g) a solar vector ring element having a tab with directional indicators thereon, said ring rotatably mounted on said frame so as to encircle said other elements while being free to rotate about said elements in the plane of said first planar surface.

2. The indicator of claim 1 wherein said planetary reference element comprises a spherical representation of the earth.

3. The indicator of claim 1 wherein said planetary reference element comprises a hemispherical representation of a planetary surface.

4. The indicator of claim 1 wherein said planetary reference element comprises a flat disc, representing a polar projection of the earth's northern hemisphere.

5. The indicator of claim 4 including markings on said first planar surface of twelve equal angular increments, said increments being labeled one for each month of the terrestrial year in succession, counterclockwise, with said second planar surface intersecting said first planar surface at the approximate locations of the September-October, and March-April, increment markings, said angle being approximately 23½ degrees and the edge of said second planar surface above said first planar surface being closest to the June-July increment marking.

6. The indicator of claim 5 including a strip, attachable to said frame, representing the Milky Way galaxy.

7. The indicator of claim 4 wherein said planar carrier plate, protractor element and Orbital Plane reference element are integral with each other and are formed by cutting and folding material of a common sheet.

* * * * *